United States Patent
Boswell et al.

Patent Number: 6,055,555
Date of Patent: Apr. 25, 2000

[54] INTERFACE FOR PERFORMING PARALLEL ARITHMETIC AND ROUND OPERATIONS

[75] Inventors: Brent Boswell, Beaverton; Karol Menezes, Portland, both of Oreg.

[73] Assignee: Intel Corporation, Santa Clara, Calif.

[21] Appl. No.: 08/999,243

[22] Filed: Dec. 29, 1997

[51] Int. Cl.$^7$ ........................................... G06F 7/38
[52] U.S. Cl. ............................................. 708/551
[58] Field of Search ................... 708/550–551, 708/496–497, 499, 629–630

[56] References Cited

U.S. PATENT DOCUMENTS

| | | | |
|---|---|---|---|
| 5,122,981 | 6/1992 | Taniguchi | 364/748.03 |
| 5,390,134 | 2/1995 | Heikes et al. | 364/748.03 |
| 5,638,313 | 6/1997 | Chu | 708/629 |
| 5,671,171 | 9/1997 | Yu et al. | 708/500 |
| 5,943,250 | 8/1999 | Kim et al. | 708/629 |

Primary Examiner—Tan V. Mai
Attorney, Agent, or Firm—Antonelli, Terry, Stout & Kraus, LLP

[57] ABSTRACT

An interface circuit performs a last step of an arithmetic operation and a round operation in parallel. The interface circuit includes a first adder circuit that receives as an input a true result of an arithmetic operation in an intermediate format. The first adder circuit outputs both the true result in a final format and a first representable number approximating the true result. A second adder circuit is connected in parallel to the first adder circuit. The second adder circuit receives the true result in the intermediate format and a 1 as inputs. The second adder circuit outputs a second representable number approximating the true result. The interface circuit also includes a selection circuit connected to the outputs of the first and second adder circuits. The selection circuit outputs either the first or second representable numbers as a rounded result of the arithmetic operation.

10 Claims, 4 Drawing Sheets

FIG. 2A

| ROUNDING MODE | ROUNDING ACTION |
|---|---|
| ROUND TO NEAREST | CLOSER TO b OF a OR c; IF EQUALLY CLOSE, SELECT EVEN NUMBER (THE ONE WHOSE LEAST SIGNIFICANT BIT IS ZERO). |
| ROUND DOWN (TOWARD $-\infty$) | a |
| ROUND UP (TOWARD $+\infty$) | c |
| CHOP (TOWARD 0) | SMALLER IN MAGNITUDE OF a OR c. |

$a \leq b \leq c$; a AND c ARE SUCCESSIVE REPRESENTABLE NUMBERS; b IS NOT REPRESENTABLE

FIG. 2B

| ROUNDING MODE | ROUNDING ACTION |
|---|---|
| ROUND TO NEAREST | CLOSER TO b OF a OR c; IF EQUALLY CLOSE, SELECT EVEN NUMBER (THE ONE WHOSE LEAST SIGNIFICANT BIT IS ZERO). |
| ROUND DOWN (TOWARD $-\infty$) | c |
| ROUND UP (TOWARD $+\infty$) | a |
| CHOP (TOWARD 0) | SMALLER IN MAGNITUDE OF a OR c. |

$c \leq b \leq a$; a AND c ARE SUCCESSIVE REPRESENTABLE NUMBERS; b IS NOT REPRESENTABLE

= UNREPRESENTABLE TR = 010110.101|0100 = 22.65625₁₀ with SIGN ↓, LSB ↑, R ↑, G ↑, S (ORED) over 0100, marker ~60

LSB ↑

1 = 010110.101 = 22.625₁₀

. = 010110.101|
  +          1
= 010110.110 = 22.75₁₀

6,055,555

INTERFACE FOR PERFORMING PARALLEL ARITHMETIC AND ROUND OPERATIONS

TECHNICAL FIELD

The present invention relates to logic circuits, and more particularly, to an interface circuit for performing parallel arithmetic and round operations.

BACKGROUND OF THE INVENTION

One type of arithmetic operation is a multiplication operation. One way to multiply two numbers is to use Booth encoding. Two numbers can be multiplied by generating partial products based on the Booth encoding. A Wallace Tree, which is a tree-like network of carry-save-adders (CSAs), can be used to add the partial products. The use of a CSA is much faster than adding the partial products linearly. The output of the Wallace tree is a true result that includes a sum word and a carry word. To obtain a final sum, however, the sum word and carry word must be added by a conventional adder with carry propagation, such as a carry-propagate-adder (CPA). A variety of arithmetic operations can use a CSA followed a CPA to add two or more numbers together.

Once the result of the arithmetic operation has been generated, the result may then be rounded. Rounding must be performed in arithmetic and store operations when the format of the destination cannot represent the precise true result. For example, a real number may be rounded if it is stored in a shorter real format, or in an integer format. There are four IEEE rounding modes: round to nearest, round down, round up and chop. Given a true result of the arithmetic operation provided as sum and carry words that cannot be represented in the format of the destination, prior art circuits first calculated the true result in a final format (such as two's complement format) and then rounded the true result to the desired number of bits. However, the prior art circuits employed separate steps to generate the true result in a final format and then to round the result to a desired number of bits. This process was slow. Therefore, there is a need for a faster technique to calculate a true result in a final format and round the result.

SUMMARY OF THE INVENTION

The interface circuit according to an embodiment of the present invention overcomes the disadvantages of the prior art by providing a first adder circuit that receives as an input a true result of an arithmetic operation in an intermediate format. The first adder circuit outputs both the true result in a final format and a first representable number approximating the true result. A second adder circuit is connected in parallel to the first adder circuit. The second adder circuit receives the true result in the intermediate format and a 1 as inputs. The second adder circuit outputs a second representable number approximating the true result. The interface circuit also includes a selection circuit connected to the outputs of the first and second adder circuits. The selection circuit outputs either the first or second representable numbers as a rounded result of the arithmetic operation.

BRIEF DESCRIPTION OF THE DRAWINGS

FIG. 2A illustrates the operation of the rounding modes for positive numbers according to an embodiment of the present invention.

FIG. 2B illustrates the operation of the rounding modes for negative numbers according to an embodiment of the present invention.

FIG. 4 illustrates an example according to an embodiment of the present invention.

DETAILED DESCRIPTION

Figure 1:
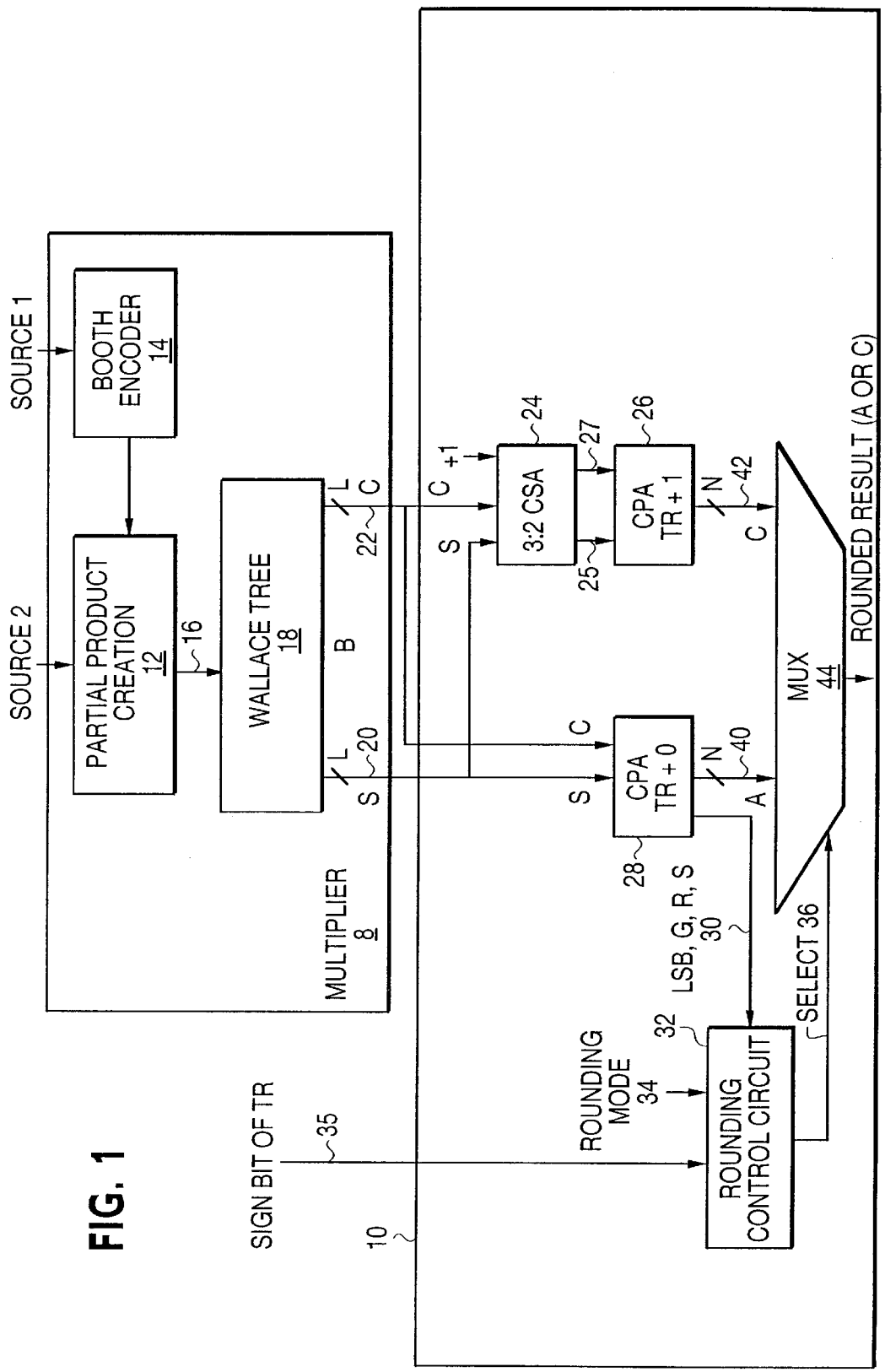
FIG. 1 illustrates a block diagram of an interface circuit according to an embodiment of the present invention.

Referring to the figures in which like numerals indicate like elements, FIG. 1 illustrates a block diagram of an interface circuit 10 according to an embodiment of the present invention. A multiplier circuit 8 is connected to interface circuit 10. Multiplier circuit 8 multiplies two numbers (source1 and source2) together to output an L-bit true result of the multiplication operation in an intermediate format. A destination of the multiplication operation can only store an N-bit result, wherein L>N. Therefore, the L-bit true result of the multiplication operation is unrepresentable and must be rounded to N bits. Interface circuit 10 completes the multiplication operation by calculating the true result in a final format and rounds the true result to N-bits in parallel. By completing the multiplication operation and rounding the multiplication result in parallel, processor speed can be improved.

According to an embodiment of the present invention, multiplier circuit 8 can include conventional multiplication circuitry, such as a Booth encoder 14, a partial product creation block 12 and a Wallace Tree 18. Two numbers, source1 and source2 are input into multiplier circuit 10 that will be multiplied together. Source 1 is input to booth encoder 14, and source2 is input into partial product creation block 12. Source1 and source 2 may be, for example, mantissas that will be multiplied together for a floating point multiplication operation. Booth encoder 14 Booth encodes source1 and outputs Booth encoding signals to partial product creation block 12. Partial product creation block 12 generates one or more partial products based on source2 and the Booth encoding signals received from Booth encoder 14. The partial products are output to Wallace Tree 18.

Wallace Tree 18 is a tree like network of carry-save-adders (CSAs) that are used to add the partial products. The use of a network of CSAs, such as a Wallace Tree, is much faster than adding the partial products in a linear fashion. However, carry propagation is not done except in the final step. Therefore, multiplier circuit 8 outputs a true result B of the multiplication operation in an intermediate (or non-final) format. In the embodiment illustrated in FIG. 1, true result B is output from Wallace Tree 18 in a sum and carry format that includes a sum word 20 and a carry word 22. Other types of intermediate formats can be used.

Both sum word 20 and carry word 22 are L-bits wide. To obtain a multiplication result that is in a final format (e.g., two's complement format), sum word 20 and carry word 22 must be added together by a conventional adder with carry propagation, such as a carry-propagate-adder (CPA). Interface circuit 10 uses carry propagate adders to obtain a multiplication result that is in a final format while, in parallel, rounding the result to N bits.

Interface circuit 10 according to an embodiment of the present invention illustrated in FIG. 1 includes two adder circuits connected in parallel, a multiplexer (MUX) 44 connected to the outputs of the adder circuits, and a rounding control circuit 32.

A first adder circuit comprises a CPA 28. CPA 28 is connected to the output of multiplier circuit 10 and receives sum word 20 and carry word 22 as inputs. CPA 28 adds L-bit sum word 20 and L-bit carry word 22 to output a L-bit true result that is in a final format. According to an embodiment of the present invention, CPA 28 outputs the L-bit true result in a two's complement format. However, other types of final formats can be used. Therefore, CPA 28 converts the L-bit output from multiplier circuit 8 provided in sum and carry format to a final format (e.g., two's complement format).

The N most significant bits of the L-bit true result output in final format from CPA 28 are output to MUX 44 as an N-bit representable number A. The remaining (less significant) bits of the L-bit true result output from CPA 28 include the guard bit (G), the round bit (R) and the sticky bit (S). The guard, round and sticky bits are output to a rounding control circuit 32 via line 30. The least significant bit (LSB) of the N-bit representable number A is also output to rounding control circuit 32 via line 30.

A second adder circuit includes a 3:2 carry save adder (CSA) 24 and a carry propagate adder (CPA) 26. CSA 24 is connected to the output of multiplier circuit 8 and receives sum word 20 and carry word 22 as inputs. CSA 24 also receives a plus 1 input as well. CSA 24 adds together sum word 20, carry word 22 and the plus 1. According to an embodiment of the present invention, CSA 24 outputs an L-bit output as a sum word 25 and a carry word 27. Other types of intermediate formats can be used. CSA 24 adds the plus 1 input to sum word 20 and carry word 22 at a bit position corresponding to the least significant bit of the N most significant bits of the L-bit true result B.

CPA 26 is connected to the output of CSA 24 and receives sum word 25 and carry word 27 as inputs. CPA 26 adds L-bit sum word 25 and L-bit carry word 27 to output an L-bit value that is in a final format. According to an embodiment of the present invention, CPA 26 outputs the L-bit value in a two's complement format. However, other types of final formats can be used. The N most significant bits of the L-bit value output in final format from CPA 26 are output to MUX 44 as an N-bit representable number C. The remaining (less significant) bits of the L-bit value output from CPA 26 are discarded (not used). Therefore, CPA 26 converts the L-bit output from CSA 24 provided in sum and carry format to an N-bit representable number C in a final format (e.g., two's complement format), wherein L>N.

Rounding control circuit 32 receives as inputs the LSB, guard (G), round (R) and sticky (S) bits from CPA 28 over line 30, a rounding mode input 34, and a sign bit of the true result provided over line 35. Rounding mode input 34 can designate one of several rounding modes. The LSB, guard, round and sticky bits are provided for allowing rounding control circuit 32 to select the desired rounding result of the multiplication operation, either A or C, based on the selected rounding mode. Rounding control circuit 32 outputs a select signal on line 36 for controlling MUX 44. MUX 44 selects either the N-bit representable number A or the N-bit representable number C as the rounded result of the multiplication operation based on the select signal provided on line 36. Rounding control is also performed based on the sign bit of the true result (TR) provided over line 35.

FIG. 2A illustrates the operation of the rounding modes for a positive true result according to an embodiment of the present invention. FIG. 2B illustrates the operation of the rounding modes for a negative true result according to an embodiment of the present invention. A true result B is output from multiplier circuit 8 and is L-bits wide. However, because the destination cannot represent the true result B, true result B must be rounded to N bits, wherein L>N. There are four IEEE rounding modes according to the IEEE 754 Standard Floating Point Number Format: round to nearest, round down, round up, and chop. The L-bit unrepresentable true result B can be rounded to N-bits by selecting either the N-bit representable number A or the N-bit representable number C as the rounded result of the multiplication operation. As illustrated in FIGS. 2A and 2B, the representable numbers A and C are successive representable numbers, wherein A is less then or equal to B which is less then or equal to C. In other words the representable numbers A and C bracket the unrepresentable number B.

Interface circuit 10 selects either representable number A or C as the N-bit rounded result based upon rounding mode input 34 and the least significant bit (LSB), guard bit (G), round bit (R) and/or the sticky bit (S) provided on line 30, and the sign bit of the true result provided on line 35. As illustrated in FIGS. 2A and 2B, when the round to nearest mode is selected, the representable number that is closest to the unrepresentable number B is selected. If both A and C are equally close to the number B, the representable number is selected that has a zero in the least significant bit. When the round down mode is selected, the unrepresentable number is rounded down toward minus infinity. When the round up mode is selected, the unrepresentable number is rounded up toward positive infinity. When the chop mode is selected, the representable number A or C is selected that is smaller in magnitude.

Figure 3:
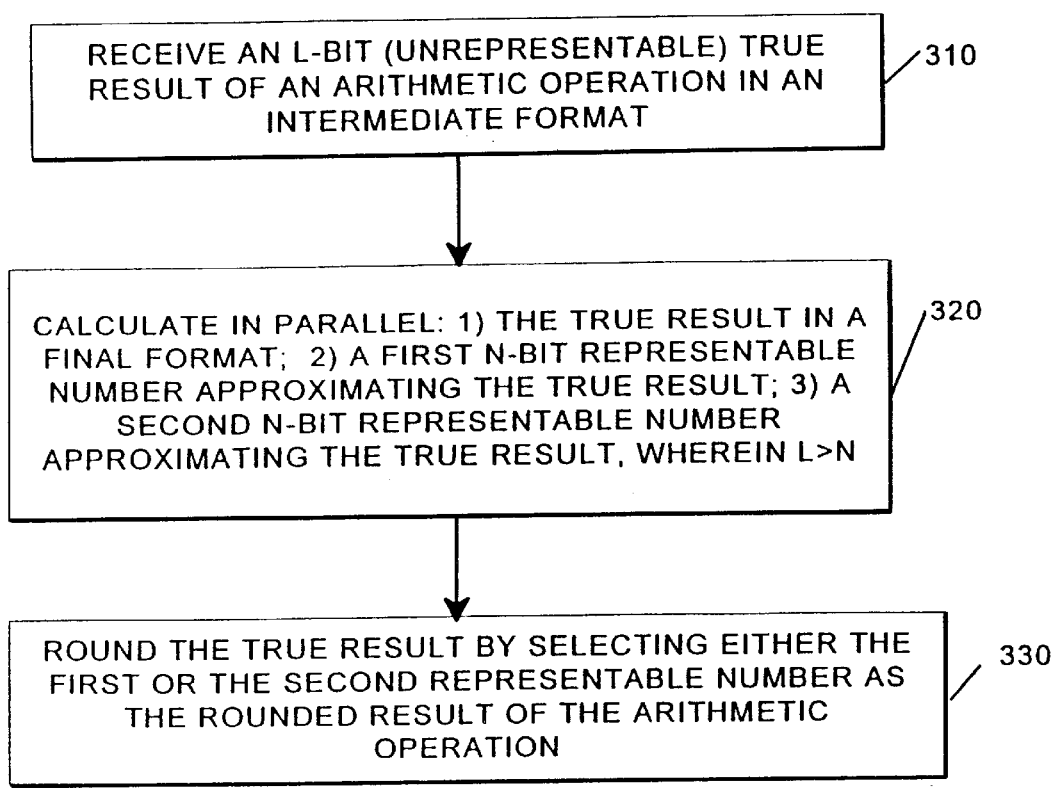
FIG. 3 is a flow chart illustrating the operation of the interface circuit according to an embodiment of the present invention.

FIG. 3 is a flow chart illustrating the operation of interface circuit 10 according to an embodiment of the present invention. At step 310, the L-bit unrepresentable true result B of the multiplication operation is output from multiplier circuit 8. The unrepresentable B is provided in an intermediate format. According to an embodiment of the present invention, the intermediate format is a sum and carry format, including a sum word 20 and a carry word 22. However other intermediate formats can be used. While interface circuit 10 of the present invention receives an unrepresentable true result B from a multiplier circuit 8, interface circuit 10 according to an embodiment of the present invention can receive an unrepresentable true result as an input from a wide variety of arithmetic circuits such as adder circuits, subtracting circuits and divider circuits as well. Interface circuit 10 can be used to both complete an arithmetic operation and, in parallel, round the arithmetic result for a variety of arithmetic operations.

At step 320, three numbers are calculated in parallel: 1) The true result B of the multiplication operation is calculated in a final format based on the intermediate format of the true result B. 2) An N-bit representable number A that approximates the unrepresentable true result B is calculated. And, 3) An N-bit representable number C is calculated that also approximates the unrepresentable true result B.

To calculate the L-bit true result B in a final format, CPA 28 adds sum word 20 and carry word 22 and outputs an L-bit true result B in a final format. According to an embodiment of the present invention CPA 28 outputs the true result B in a two's complement format. By adding sum word 20 and carry word 22, CPA 28 performs the last step of the multiplication operation. The N most significant bits of the L-bit true result B in the final format output from CPA 28 comprise the N-bit representable number A. Therefore, it can be seen that by calculating the L-bit true result B in the final format, CPA 28 also simultaneously calculates the N-bit representable number A. Also, the least significant bit of the N-bit representable number A, and the guard bit, round bit, and sticky bit of the L-bit true result B in the final format are output over line 30 to rounding control circuit 32.

The N-bit representable number C is calculated by CSA 24 and CPA 26 based on sum word 20, carry word 22 and a 1 that are input to CSA 24. Sum word 20 and carry word 22 are both L-bits wide. The 1 is added to sum word 20 and carry word 22 at a bit position corresponding to the least significant bit of the N most significant bits of the L-bit true result B. Because sum word 20 and carry word 22 are L-bits wide, CSA 24 can comprise an array of carry save adders. CSA 24 outputs an L-bit value in an intermediate format. According to an embodiment of the present invention, CSA 24 outputs the L-bit value in a sum and carry format that includes sum word 25 and carry word 27. CPA 26 completes the multiplication operation (e.g., converts the L-bit output from CSA 24 from the intermediate format to a final format). According to an embodiment of the present invention, CPA 26 converts the L-bit output of CSA 24 from the sum and carry format to a two's complement format. The N most significant bits of the L-bit output from CPA 26 comprise the N-bit representable number C. The remaining bits of the L-bit output from the CPA 26 are disregarded.

At step 330, the unrepresentable true result B is rounded by selecting either the first representable number A or the second representable number C as the rounded result of the multiplication operation. Rounding control circuit 32 outputs either a low or high as a select signal on line 36 based upon rounding mode input 34 and one or more of the least significant bit, the guard bit, the round bit, and the sticky bit provided on line 30. MUX 44 selects either representable number A or representable number C based upon the select signal on line 36.

FIG. 4 illustrates an example according to an embodiment of the present invention. According to the example in FIG. 4, the unrepresentable true result B is a 13 bit positive number in two's complement that equals $22.65625_{10}$. In this example the 13 bit floating point number must be rounded to 9 bits to fit a destination register. Therefore, in this example, L=13, and N=9. A line 60 separates the 9 most significant bits of the unrepresentable true result B from the less significant 4 bits that cannot be stored in the 9 bit destination. The least significant bit (LSB) of the 9 most significant bits of the true result B, the guard bit (G), the round bit (R), the sticky bits and the sign bit are illustrated in FIG. 4. The bits after the round bit are ORed together to obtain the sticky bit. Therefore, it can be seen that the 9 bit representable number A comprises the 9 most significant bits of the unrepresentable true result B. The 9-bit representable number A is illustrated in FIG. 4 and is equal to $22.625_{10}$. The 9-bit representable number C is obtained by adding 1 to the least significant bit of the 9 most significant bits of the unrepresentable true result B. This operation is illustrated in FIG. 4. The nine-bit representable number C is equal to $22.75_{10}$.

MUX 44 and rounding control circuit 32 operate to select one of the 9-bit representable numbers A or C to be the rounded result of the multiplication operation. Because the true result B is positive, the rounding rules of FIG. 2A are applied. If the rounding mode is round to nearest, then MUX 44 and rounding control circuit 32 operate to select the number A because it is closest to the unrepresentable true result B. If the mode is round down, the number A will be selected. If the mode is round up, the number C will be selected. If the rounding mode is chop, the number A will be selected.

The interface circuit 10 according to an embodiment of the present invention includes a first adder circuit and a second adder circuit connected in parallel, a MUX 44 and a rounding control circuit 32. Interface circuit 10 operates to perform a last step in an arithmetic operation and a round operation in parallel. A true result B of an arithmetic operation (such as an add, subtract, multiply or divide operation) in an intermediate format is output to interface circuit 10 from an arithmetic circuit (such as multiplier 8). The true result B can be provided, for example, in a sum and carry format. A sum word 20 and a carry word 22 of the true result B are input to the first and second adder circuits.

According to an embodiment of the present invention, the first adder circuit includes a CPA 28. CPA 28 calculates the true result B in a final format and an N-bit representable number A in parallel. The N-bit representable number A comprises the N most significant bits of the L-bit true result B in final format.

According to an embodiment of the present invention, the second adder circuit includes a CSA 24 and a CPA 26. The second adder circuit receives sum word 20, carry word 22 and a 1 as inputs, and calculates an N-bit representable number C. The 1is added at a bit position corresponding to the LSB of the N most significant bits of the true result B. According to one embodiment, representable numbers A and C are successive numbers that bracket the true result B. Rounding control circuit 32 and MUX 44 select either number A or number B as the rounded result of the arithmetic operation.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An interface circuit for performing parallel arithmetic and round operations comprising:

a first adder circuit receiving a true result of an arithmetic operation in an intermediate format as an input, and outputting both the true result in a final format and a first representable number approximating the true result;

a second adder circuit, connected in parallel to the first adder circuit, the second adder circuit receiving the true result in the intermediate format and a 1 as inputs, and outputting a second representable number approximating the true result said second adder circuit comprising:

a carry save adder receiving as inputs the L-bit true result in the intermediate format and a 1, the carry save adder outputting an L-bit output in the intermediate format; and a carry propagate adder connected to the output of the carry save adder, said carry propagate adder converting the L-bit output from the carry save adder in the intermediate format to an L-bit output in the final format, the N most significant bits of the L-bit output of the carry propagate adder comprising the second N-bit representable number; and a selection circuit connected to the outputs of the first and second adder circuits, the selection circuit outputting either the first or second representable number as a rounded result of the arithmetic operation.

2. The interface circuit of claim 1 wherein said first adder circuit comprises a first adder circuit receiving an L-bit true result of an arithmetic operation in an intermediate format as an input, and outputting both the L-bit true result in a final format and a first N-bit representable number approximating the true result, wherein L is greater than or equal to N; and wherein the second adder circuit comprises a second adder circuit, connected in parallel to the first adder circuit, the second adder circuit receiving the L-bit true result in the intermediate format and a 1 as inputs, and outputting a second N-bit representable number approximating the true result, the 1 being added to the intermediate format true result at a bit position corresponding to the LSB of the N most significant bits of the intermediate format true result.

3. The interface circuit of claim 2 wherein the first N-bit representable number output from the first adder circuit comprises the N most significant bits of the true result in the final format output from the first adder circuit.

4. The interface circuit of claim 2 wherein said first adder circuit comprises a first adder circuit receiving an L-bit true result of an arithmetic operation in a sum and carry format as an input, and outputting both the L-bit true result in a two's complement format and a first N-bit representable number approximating the true result, wherein L is greater than or equal to N, the first N-bit representable number comprising the N most significant bits of the L-bit true result.

5. The interface circuit of claim 2 wherein the selection circuit comprises:
 a rounding control circuit connected to the output of the first adder circuit and outputting a select signal based on one or more bits of the L-bit true result in the final format;
 a multiplexer receiving the first and second N-bit representable numbers as inputs and outputting one of the N-bit representable numbers as a rounded result of the arithmetic operation based on the select signal.

6. The interface circuit of claim 5 wherein said rounding control circuit further includes a rounding mode input designating a rounding mode, wherein said rounding control circuit outputs a select signal based on one or more of the guard, round and sticky bits of the L-bit true result in the final format and the rounding mode input.

7. The interface circuit of claim 2 wherein said rounding control circuit comprises a rounding control circuit connected to the first adder circuit and receiving as inputs at least the guard, round and sticky bits of the L-bit true result output in the final format, the rounding control circuit outputting a select signal based on one or more of the guard, round and sticky bits of the L-bit true result in the final format.

8. The interface circuit of claim 2 wherein the first and second representable numbers are successive N-bit numbers bracketing the true result.

9. The interface circuit of claim 1 wherein said first adder circuit comprises a carry propagate adder.

10. The interface circuit of claim 9 wherein said true result in the intermediate format comprises a true result in a sum and carry format.

* * * * *